US006529648B1

United States Patent
Noé

(10) Patent No.: US 6,529,648 B1
(45) Date of Patent: Mar. 4, 2003

(54) EMULATOR AND COMPENSATOR FOR POLARIZATION MODE DISPERSION

(75) Inventor: Reinhold Noé, Paderborn (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/673,501

(22) PCT Filed: Apr. 7, 1999

(86) PCT No.: PCT/DE99/01046

§ 371 (c)(1),
(2), (4) Date: Oct. 16, 2000

(87) PCT Pub. No.: WO99/53363

PCT Pub. Date: Oct. 21, 1999

(30) Foreign Application Priority Data

Apr. 14, 1998 (DE) .......................................... 198 16 178

(51) Int. Cl.[7] .................................................. G02B 6/27
(52) U.S. Cl. ........................................... 385/11; 385/28
(58) Field of Search ................................ 385/11, 15, 28, 385/29; 359/487–489, 494, 497, 499, 500

(56) References Cited

U.S. PATENT DOCUMENTS 6,381,385 B1 * 4/2002 Watley et al. ................. 385/28
2001/0024538 A1 * 9/2001 Khosravani et al. .......... 385/11

FOREIGN PATENT DOCUMENTS

WO       WO02/32023 A1 * 4/2002 ........... H04B/10/18

OTHER PUBLICATIONS

Electronics Letters, (May 1981) vol. 17, No. 11, Polarisation Maintenance in Circularly Birefringent Fibres, pp. 388–389.
Electronics Letters, (Sep. 1985) vol. 21, No. 20, New Polarisation–State Control Device: Rotatable Fibre Cranks, pp. 895–896.
Electronics Letters, (Jan. 1986) vol. 22, No. 2, Endlessly Rotatable Fractional–Wave Devices for Single–Mode–Fibre Optics, pp. 78–79.
Conference Volume of the Optical Fiber Communications Conference (1995) OFC '95, WQ2, pp. 190–193, M. Ioki et al.
IEEE Journal of Lightwave Technology, vol. 9, No. 10, (Oct. 1991), Reinhold Noe et al., Comparison of Polarization Handling Methods in Coherent Optical Systems, pp. 1353–1366.
Ulrich, R. et al., "Polarization Optics of Twisted Single–Mode Fibers", Applied Optics, vol. 18, No. 13, Jul. 1979, pp. 2241–2251.
Patscher, J. et al., "Component for Second–Order Compensation of Polarisation–Mode Dispersion", Electronics Letters, Jun. 1997, IEE, UK, vol. 33, No. 13, pp. 1157–1159.
Takahashi, T. et al, "Automatic Compensation Technique for Timewise Fluctuating Polarisation Mode Dispersion in In–Line Amplifier Systems", Electronics Letters, vol. 30, No. 4, Feb. 1994, pp. 348–349.

* cited by examiner

Primary Examiner—John D. Lee
(74) Attorney, Agent, or Firm—Bell Boyd & Lloyd LLC

(57) ABSTRACT

An emulator or compensator (EK) of polarization mode dispersion of a polarization-maintaining light waveguide (PMF) with a differential group delay time (DGD), a polarization transformer (PT) and an output (AA). The polarization transformer (PT) is likewise implemented in polarization-maintaining light waveguide and allows endless polarization transformations. The emulator or compensator (EK) can be composed of a plurality of individual emulators or compensators (1, 2, . . . N) that respectively comprise an input (E) and an output (A).

10 Claims, 2 Drawing Sheets

EMULATOR AND COMPENSATOR FOR POLARIZATION MODE DISPERSION

BACKGROUND OF THE INVENTION

1. Field of the Invention

The invention is directed to an emulator and compensator for polarization mode dispersion with which the polarization of an electromagnetic, preferably optical, wave can be modified frequency-dependent.

The invention is therefore a frequency-dependent polarization transformer at the same time.

2. Description of the Related Art

Long light waveguide transmission links are utilized in optical transmission technology. Conditioned by manufacture, the light waveguides themselves are not completely isotropic but slightly birefringent. A frequency-dependent polarization transformation of the transmission link derives because of the great transmission length. This is called "polarization mode dispersion" or "polarization dispersion" (PMD). This dispersion leads, in particular, to the spreading of transmitted pulses, which limits the usable transmission data rate. The situation is aggravated in that the transmission behavior and, thus, the PMD of the link changes due to temperature or mechanical stressing. Adaptive PMD compensators are therefore required that are inserted into the transmission path. For developing these or simply for testing the PMD tolerance of transmission systems that are not PMD-compensated, adjustable but simple, cost-beneficial and low-attenuation PMD emulators are often used that can simulate the frequency-dependent polarization transmission behavior of LWG links having a length of up to several 1000 km at different points in time and at different temperatures in a statistically significant way.

At at least one optical frequency, the PMD compensator can make the polarization transmission behavior of the overall system of transmission link and compensator (or vice versa, dependent on the arrangement) approximately frequency-independent in approximation of the first and, potentially, higher order as well. The aim in wavelength-division multiplex mode is to achieve this frequency independence at the operating wavelengths. The invention can be utilized both as a PMD emulator as well as a PMD compensator.

Demands made of such an assembly are low insertion attenuation, compatibility with light waveguides and frequency-independently variable polarization transmission behavior in many aspects.

Clearly, an assembly that has the same or, respectively, inverse transmission properties as a transmission link is suitable for the emulation or compensation of PMD. In the literature, PMD is often mathematically described by many retarders or polarization rotators that are arranged between more highly birefringent LWG sections, i.e., LWG sections exhibiting noticeable delay times between the two principal polarizations. These highly birefringent LWG sections maintain or preserve two principal polarizations (principal states of polarization), (PSP), orthogonal relative to one another and are therefore polarization-maintaining light waveguides (polarization-maintaining fibers), (PMF). These PMF are highly polarization dispersive. A corresponding example is described in the Conference Volume of the Optical Fiber Communications Conference 1995 (OFC '95) of the Optical Society of America as Presentation WQ2 on pages 190–192.

Electron. Lett., Feb. 17, 1994, Volume 30, No. 4, pp. 348–349 describes PMD compensation. Here, too, a plurality of PMF sections that are connected by polarization transformers are employed. This reference is significant because it discloses the connection of a PMD compensator to an optical receiver as well as the acquisition of a control criterion and therefore serves as a genus for this invention. One can see that such arrangements can be employed both as PMD compensators as well as as PMD emulators. In practice, the references are limited to very few PMF sections and the optical attenuation that occurs should probably be rather high due to the required splice connections. Functionally similar or equivalent arrangements that allow a great number of such polarization transformers and PMF sections to be cascaded such that they exhibit a very low attenuation, however, are unknown.

SUMMARY OF THE INVENTION

It is therefore an object of the present invention to specify a PMD emulator and PMD compensator that has a very low insertion attenuation compared to the Prior Art and that can also be easily manufactured.

This object is achieved by an apparatus that is an emulator or compensator of polarization mode dispersion of a light wave comprising an input; a light waveguide connected to the input, of which at least one part is a polarization-maintaining light waveguide with a differential group delay time; a polarization transformer connected to the light waveguide; an output connected to the light waveguide; a light waveguide that merges butt-free and splice-free into a polarization-maintaining light waveguide that has a linear birefringence comprising a differential group delay time that can be exposed to a mechanical stressing in a polarization transformer; and a conversion mechanism that can at least partly convert a principal polarization of the polarization-maintaining light waveguide into an other principal polarization orthogonal to the principal polarization with an arbitrary and interruption-free, selectable phase shift relative to the principal polarization.

In the inventive apparatus, the light waveguide may be constructed such that: 1) the light waveguide is twisted between neighboring retaining points that do not enclose a polarization transformer so that the light waveguide acts as a polarization-maintaining light waveguide with circular birefringence, and 2) the light waveguide is not twisted, at least in a specific position of fiber loops, between retaining points enclosing a polarization transformer that comprises at least one movable fiber loop that, given movement, causes a mechanical stressing of the light waveguide, so that the fiber loops act like rotatable wave plates.

The light waveguide may comprise a polarization-maintaining light waveguide with linear birefringence.

The inventive apparatus may contain at least one anchor point of the conversion mechanism comprises a plurality of comb tines, the comb tines belonging to different anchor points being movable relative to one another and following one another in periodic succession, so that torsion sections proceeding therebetween can be twisted in a periodically changing rotational manner.

A plurality of anchor points of the conversion mechanism that are separated from one another by successive torsion sections between two ending anchor points may be used as may a stepping motor for rotating an anchor point of the conversion mechanism.

At least one of the fiber loops can act at least approximately as a rotatable quarter-wave plate.

A plurality of individual emulators or compensators each having a respective input and an output, may be used wherein an output of an individual emulator or compensator can be connected to an input of a following one.

A longer section of polarization-maintaining optical fiber (PMF) is inventively suitable for manufacturing a PMD emulator or PMD compensator. The principal polarizations, as in the case of commercially obtainable, polarization-maintaining optical fibers, are thereby preferably approximately linear in a first exemplary embodiment. Torsion sections in which the PMF twists that result in polarization transformations are distributed over the length.

The torsion of PMF is already known as a mechanism from Applied Optics, Vol. 18, No. 13, pages 2241–2251, as a mechanism with which the polarization transformation can be implemented in linearly birefringent LWGs, see FIG. 9 therein. However, the birefringence of commercially obtainable PMF is so great that a torsion by the 68° recited therein would destroy the PMF, at least over the long term.

For use of commercially obtainable PMF, a plurality of torsion sections having alternating torsion direction are therefore inventively cascaded for producing the desired transformation. Alternately, a specific PMF that is more weakly birefringent than commercially obtainable PMF but far more highly birefringent than normal LWG may be provided.

The torsion can be variably fashioned in all of these instances, by, for example, employing stepping motors.

The range of torsion that is naturally limited because of the limited mechanical strength of light waveguides can impeded compensatability, particularly for operation as a PMD compensator. Function imprecisions can also arise due to lengths of the torsion sections that are not ideally defined due to manufacturing factors and similar influences. These potential disadvantages can be eliminated by inserting additional torsion sections. It can thereby be beneficial to arrange a plurality of mutually independently twistable torsion sections or groups of torsion sections close to one another. "Endless polarization controls" are desirable because to as endless polarization controls are desirable. The reason for this is that, particularly, for operation as a PMD compensator, an interruption-free compensation is required; any, interruption (even short) could lead to undesired bit errors in the receiver because of the extremely high transmission bit rates that are usually present. IEEE Journal of Lightwave Technology, Vol. 9, October 1991, No. 10, pages 1353–1366 provides a good overview of endless polarization controls as, in particular, do the references cited within. Endless polarization controls that are based on twistable, polarization-maintaining optical fibers, however, are not yet known.

Instead of linearly birefringent PMF, circularly or elliptically birefringent PMF can also be utilized. However, the polarization transformers would then have to be modified.

BRIEF DESCRIPTION OF THE DRAWINGS

A more detailed description of inventive PMD emulators and PMD compensators follows on the basis of FIGS. 1 through 5.

DESCRIPTION OF THE PREFERRED EMBODIMENTS

Figure 1:
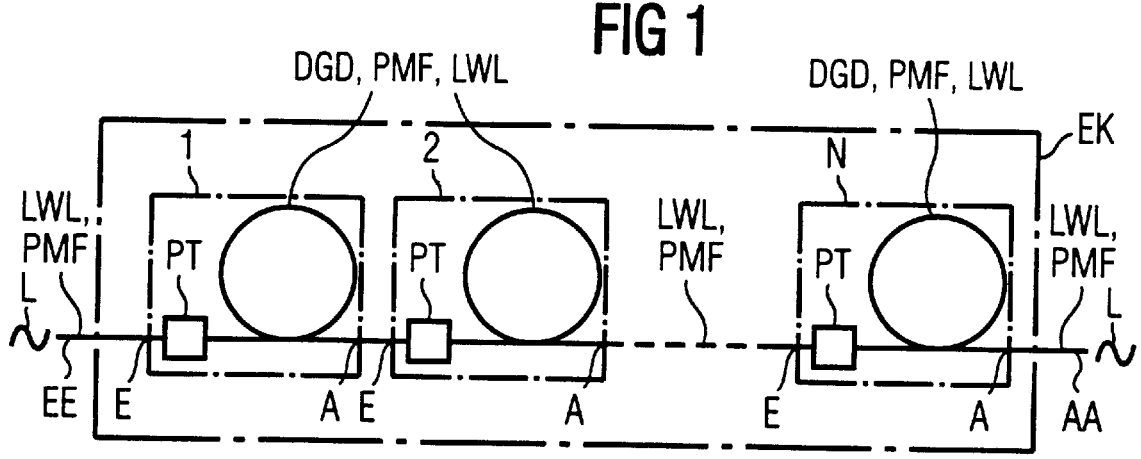
FIG. 1 is a schematic diagram showing an inventive PMD emulator or compensator.

In the exemplary embodiment of FIG. 1, a light wave L passes through a PMD emulator or compensator EK within a light waveguide LWL from an input EE to an output AA. The light waveguide LWL is composed of polarization-maintaining light waveguide PMF that is not interrupted and is also not cut during manufacture and also need not be spliced, except at the input EE and output AA. For this reason, the PMD emulator or compensator EK has a very low insertion attenuation for the light wave L. The PMD emulator or compensator EK contains a chain of simple emulators or compensators 1, 2 . . . N. Each of these simple emulators or compensators 1, 2 . . . N in turn has an input E and an output A, where the output A of a simple emulator or compensator is respectively connected to the input E of a following one. In each of the simple emulators or compensators 1, 2 . . . N, the input E is followed by a polarization transformer PT, a polarization-dispersive light waveguide PMF having a differential group delay time DGD and the output A.

Input EE and output AA of the arrangement can also be interchanged, so that the light wave L does not pass through the arrangement from the input EE to the output AA but in the opposite direction. The sequence of polarization transformer PT and light waveguide exhibiting differential group delay time DGD can also be interchanged compared to the described sequence in one, several or all individual emulators or compensators 1, 2 . . . N.

The polarization-dispersive light waveguide having the group delay time DGD is a section of polarization-maintaining light waveguide PMF selected with a suitable length. Commercially obtainable PMF have beat wavelengths within which a phase delay of 360° or a cycle duration time delay of the light wave arises between the two principal polarizations, on the order of magnitude of 2 through 4 mm given a wavelength of 1550 nm of the light wave L. This corresponds to a differential delay time DGD of the polarization-dispersive light waveguide of 2.6 through 1.3 ps per meter of length. Differential delay time of a uniform birefringent light waveguide with a fixed length and beat wavelength of the birefringent scale inversely relative to one another.

The overall number of simple emulators or compensators can vary within broad limits, between one and large numbers such as 100 or 200 that are just still economically feasible. It is beneficial to select an overall low number but nonetheless high enough that similar statistical properties of the polarization dispersion derive as in the light waveguide to be emulated or compensated. Depending on the requirements, approximately 6 through 50 simple emulators or compensators are required for this purpose.

Inventively, many simple emulators or compensators can be particularly expediently utilized when PMD emulation or, compensation is desired for extremely broadband signals, i.e., for example, for data signals having a high transmission bit rate or for a plurality of or for many signals in optical wavelength-division multiplex mode.

Figure 2:
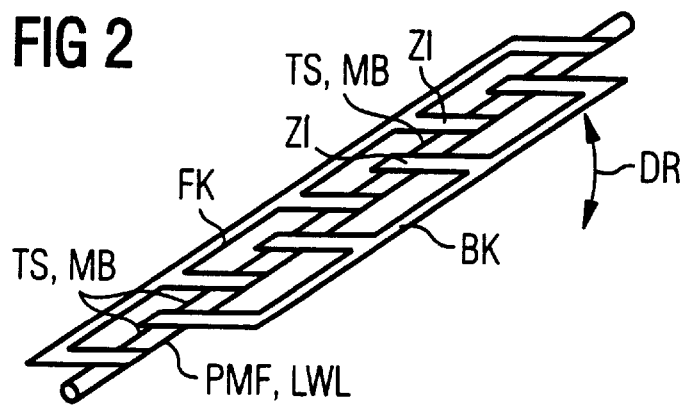
FIG. 2 is a pictorial diagram showing a phase-matched mode converter as polarization transformer.

When the invention is utilized only as a PMD emulator, it is necessary for minimizing the outlay to use only one mode converter as a polarization transformer PT. Further polarization transformations arise, namely, due to temperature drift of the polarization-maintaining light waveguide PMF anyway. Differing from a good compensator, these can be tolerated in the emulator. A mode converter for linearly birefringent polarization-maintaining light waveguides PMF can be inventively implemented as a phase-matched mode converter, as shown in FIG. 2. The mode converter contains a polarization-maintaining light waveguide PMF to which two interengaging torsion anchors FK, BK—which have the form of combs here—are secured, for example, with epoxy glue. These can be turned relative to one another around the polarization-maintaining light waveguide PMF as the axis, where, comb parts lying at the outside can turn in a rotational direction DR. Both torsion anchors can be movably implemented or one maybe a fixed torsion anchor FK while the other is a movable torsion anchor BK. For example, stepping motors SM are suitable for driving the anchors BK, these being capable of operating in a path-continuous micro-step mode for achieving high resolution. By turning the torsion anchors or combs FK, BK relative to one another, a torsion of the short light waveguide sections TS between the comb tines ZI also occurs. The torsion in the torsion segments TS is a mechanical stressing MB. For enhancing the clarity of the illustrative figures, only a few of the total of light waveguide sections TS, comb tines ZI and mechanical stresses MB that are in fact present are provided with reference characters.

When, for example, the fixed torsion anchor or comb FK has only two tines and the movable torsion anchor or comb BK has only one tine, so that it devolves into a rotating lever, then a mode converter derives that is already known from Applied Optics, Vol. 18, No. 13, pages 2241–2251 (see FIG. 9 therein). The employment of a plurality of comb tines ZI, however, has the advantage that smaller rotational angles of the two combs BK, FK relative to one another are required. In particular, the birefringence of commercially obtainable PMF is so high that a torsion by the 68° recited in the reference would destroy the PMF, at least over the long term. The length within which the 68° torsion must take place namely, only amounts to 0.7 mm in the case of 2 mm beat wavelength. The torsion angles are allowed to be smaller with more torsion sections present, and the lengths of the torsion sections TS come all the closer to a half beat wavelength of the light wave L in the polarization-maintaining light waveguide PMF.

Figure 3:
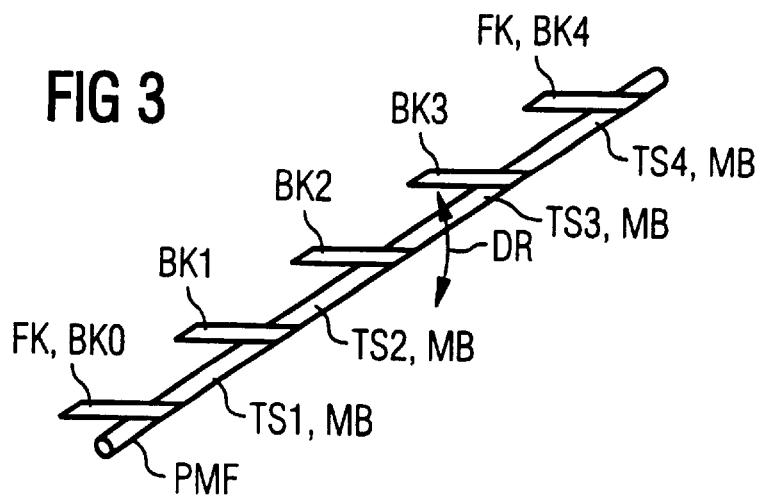
FIG. 3 is a pictorial diagram showing an endless polarization transformer with twisted sections of linearly birefringent light waveguide.

When the invention is used as an especially versatilely variable PMD emulator or as PMD compensator, it is expedient, to utilize many simple emulators or, compensators or variable polarization transformers PT. The latter instance is illustrated by way of example in FIG. 3. The fixed torsion anchor FK here has only two tines. In contrast, a plurality of movable torsion anchors BK1, BK2, BK3 are present.

In particular, three is suitable as the plurality of movable torsion anchors because an endless polarization transformer is thereby inventively possible. Alternatively, two such anchors may be used in order to obtain a technologically simpler embodiment, or four and more movable torsion anchors may be used in order to facilitate the realization and drive of the polarization transformers. Particularly when the beat wavelength of the polarization-maintaining light waveguide PMF cannot be exactly identified or fluctuates topically dependent, it is better to use more than three movable torsion anchors. The fixed torsion anchors FK—one or both—can also be replaced by movable torsion anchors BK0, BK4. This inventively offers additional variability of the polarization transformation, so that deviations of the lengths of the torsion sections TS1, TS2, TS3, TS4 from the desired value, inhomogeneities of the birefringence of the light waveguide PMF, and similar imprecisions cannot deteriorate the capability for endless polarization regulation.

If the anchor points initially are negligibly short, so that the polarization transformer PT is quasi-composed only of twistable light waveguides, then the lengths of the four torsion sections TS1, TS2, TS3, TS4 of the light waveguide PMF are approximately selected of such a size in this case that the phase delay occurring in the torsion-free operation between the fast and the slow oscillation mode of the light waveguide PMF is approximately equal to 1.7 rad. This corresponds to a $1.7/(2*pi)=0.27$ multiple of a beat wavelength. In order to prevent inhomogeneities of the birefringence of the light waveguide PMF and similar imprecisions from deteriorating the capability for endless polarization regulation, these lengths can also be varied; for example, the torsion sections TS1, TS4 can be respectively selected of such a length that they comprise phase delays of approximately 1.6 rad; and torsion sections TS2, TS3 can be respectively selected of such a length that they comprise phase delays of approximately 1.8 rad.

In order to inventively enable endless polarization transformations, torsion anchors BK2—under idealized preconditions—should be rotatable by at least approximately ±73° and torsion anchors BK1, BK3 should be respectively rotatable by at least approximately ±35° relative to the torsion-free position. Since it is not only the principal axes that geometrically turn given the torsion of the light waveguide PMF but the polarization ellipse of the optical wave also co-rotates to a slight extent by approximately 5 through 10% of the geometrical rotation, the torsion range of the torsion anchors multiplied in practice by a factor F of approximately 1.05 through 1.1, so that one arrives at approximately ±79° for torsion anchor BK2 and at approximately 38° for torsion anchor BK1, BK3. These values can fluctuate by approximately ±10% dependent on the light waveguide type.

Further variations both of the lengths of the torsion sections TS1, TS2, TS3, TS4 as well as of the turnability of the torsion anchors BK1, BK2, BK3 can be called for in that the fastenings to the anchor points FK, BK0, BK1, BK2, BK3, BK4 do not ensue punctiform, but rather over a certain length, so that successive torsion sections are separated by a small section of non-twistable but birefringent (since it is polarization-maintaining) light waveguide.

Endless polarization transformation is always possible when specific, shared, periodic rotational angle changes of the movable torsion anchors BK1, BK2, BK3 can be specified such that a principle polarization of the polarization-maintaining light waveguide PMF in every phase of these rotational angle changes is at least approximately transformed onto the other principal polarization orthogonal relative to the first. All other possible and required polarization transformations can then be achieved with rotational angles that are smaller than those specified in this way. With computer support, this can be easily calculated even taking the finite fastening widths at the anchor points into consideration, so that the required lengths of the torsion sections as well as the rotational angle ranges can be indicated without difficultly for many exemplary embodiments of the invention. Depending on the fastening widths, clear variations of the lengths and rotational angle ranges cited above as required can thus be achieved. The following table provides a few exemplary embodiments. The values were not calculated with the great precision that the table suggests, in practice, inhomogeneities of the polarization-maintaining light waveguide and other disturbing influences cause greater imprecisions anyway, which can be eliminated by individual rotational angle drive of the torsion anchors and, potentially, more torsion anchors. The selection of lengths of the torsion sections TS1, TS2, TS3, TS4 and light waveguide fastening widths of the torsion anchors BK1, BK2, BK3 make it possible to be able to construct a compact and high-performance exemplary embodiment with polarization-maintaining light waveguide PMF having a given beat wavelength and given mechanical design rules.

In the table, the columns denote:

TS1, TS4 the differential delays in radiant of the torsion sections TS1, TS4,

TS2, TS3 the differential delays of the torsion sections TS2, TS3 in radiant,

CA, CB, CC circular birefringence parts of the torsion sections in radiant that, as explained later, have a direct relationship to the required rotational angles of the anchor points BK1, BK2, BK3, and VV the differential delays in radiant of the parts of the polarization-maintaining light waveguide secured to the torsion anchors BK1, BK2, BK3.

CA, CB, and CC specify the indicated, periodic rotational angle changes of the movable torsion anchors BK1, BK2, and BK3 that convert one principal polarization of the polarization-maintaining light waveguide PMF in each phase of these rotational angle changes at least approximately into the other principal polarization orthogonal relative to the first. The actual rotational angles in radiant derive as follows:

for torsion anchor BK1: F*(CA/2*cos(phi)+CC/2*sin(phi))

for torsion anchor BK2: F*CB/2*cos(phi)

for torsion anchor BK3: F*(CA/2*cos(phi)−CC/2*sin(phi))

Phi is an angle that continuously changes, and F is the previously mentioned factor. Given punctiform fastening to the torsion anchors, i.e. VV=0, and an assumed value F=1.08, the extreme values ±1.08*2.55 rad /2=±79° recited above derive, for example, for the rotational angles of torsion anchor BK2.

| TS1, TS4 | TS2, TS3 | CA | CB | CC | VV |
|---|---|---|---|---|---|
| 1,6822 | 1,7063 | 0,3838 | 2,5547 | 1,2078 | 0 |
| 1,2671 | 1,5748 | 0,3495 | 2,3959 | 1,1854 | 0,2618 |
| 1,4455 | 1,1221 | 0,5732 | 2,6100 | 1,0970 | 0,5236 |
| 1,2025 | 0,8886 | 0,6022 | 2,5738 | 1,0694 | 0,7854 |
| 1,3073 | 0,4848 | 0,8161 | 2,8904 | 1,0063 | 1,0472 |
| 1,0198 | 0,2692 | 0,8146 | 2,8355 | 0,9983 | 1,3090 |
| 0,8165 | 0,0201 | 0,8617 | 2,8883 | 0,9779 | 1,5708 |
| 0,8589 | −0,3367 | 1,0935 | 3,3401 | 0,9318 | 1,8326 |
| 2,7641 | 1,4520 | 0,7614 | 2,7293 | 1,8135 | 2,0944 |
| 2,5026 | 1,3362 | 0,7189 | 2,6072 | 1,6315 | 2,3562 |
| 1,8341 | 1,4392 | 0,8738 | 2,8254 | 1,2814 | 2,6180 |
| 0,9181 | 1,5792 | 1,1139 | 3,3008 | 1,0629 | 2,8798 |
| 1,1501 | 1,1127 | 0,8317 | 2,7393 | 1,1223 | 3,1416 |
| 1,1970 | 0,7358 | 0,6622 | 2,4338 | 1,1670 | 3,4034 |
| 0,9436 | 0,5144 | 0,6253 | 2,3754 | 1,1342 | 3,6652 |
| 1,3571 | −0,0743 | 0,3394 | 1,9702 | 1,3624 | 3,9270 |
| 1,3911 | −0,4864 | 0,1727 | 1,7839 | 1,5200 | 4,1888 |
| 2,6186 | 3,1806 | −1,0906 | 2,9154 | 1,7668 | 4,7124 |
| 2,2898 | 3,1127 | −0,7477 | 2,8373 | 1,6412 | 4,9742 |
| 1,9981 | 2,9663 | −0,4681 | 2,7409 | 1,5389 | 5,2360 |
| 1,4313 | 2,9682 | −0,4526 | 2,5668 | 1,4914 | 5,4978 |
| 1,2133 | 2,7217 | −0,2611 | 2,4324 | 1,4389 | 5,7596 |
| 1,8867 | 1,9482 | 0,3109 | 2,6135 | 1,2669 | 6,0214 |
| 1,6822 | 1,7063 | 0,3838 | 2,5547 | 1,2078 | 6,2832 |

Further exemplary embodiments derive due to longer torsion sections TS1, TS2, TS3, TS4 that are longer than indicated by a whole plurality of beat wavelengths of the light wave. In this situation, the torsion angles are changed such that an unvaried torsion rate, i.e., angular change, derives per length unit. In this way, the indicated examples having negative lengths can also be converted into realizable exemplary embodiments. The analogous case applies to the column VV. This can be easily seen by comparing the first and the last row of the table; these rows differ, namely, simply by the value 2*pi radiant in the column VV. The angles CA, CB, CC indicated in the table are also simply to be understood as reference values, since it can be expedient for achieving greater variability of polarization transformations to provide clearly greater rotational angles CA, CB, CC, for example, enlarged by a factor 1.5 or even 2.

Exemplary embodiments having more than three movable torsion anchors can, for example, be fashioned such that the same torsion profiles, as a function of the location in the polarization-maintaining light waveguide PMF can be at least approximately achieved as in the indicated examples.

In order to be able to twist the length, for example, 0.27 times a beat wavelength, by a rotational angle range of this order of magnitude, for example ±79° or even more, without destroying the polarization-maintaining light waveguide in order, namely, to have further control possibilities available, the beat wavelength must be selected sufficiently large. Beat wavelengths of 10 through 200 mm, preferably those in the range of 30 and 100 mm, particularly come into consideration. For an assumed 50 mm beat wavelength given a 1550 nm wavelength of the light wave L, the differential delay time amounts to approximately 0.1 ps per meter. In order to obtain a differential group delay time DGD of, for example, 25 ps, approximately 250 meters of polarization-maintaining light waveguide PMF are therefore required. Given, for example, ten individual emulators or compensators with this differential group delay time DGD, a total of approximately 2.5 km of light waveguide is therefore required. Polarization-maintaining light waveguide with linear birefringence on the above order of magnitude can easily be manufactured according to the prior art on the basis of elliptical core cross-section or by designational integration of mechanical stresses. What is disadvantageous but acceptable given a greater beat wavelength, is the greater length required for achieving a specific differential group delay time DGD and the lower degree of polarization maintenance. Due to the extremely low attenuation of silica glass optical fibers, the former causes no especially high attenuation losses, and the latter can be taken into consideration in the installation of the polarization transformers PT on the basis of a plurality of anchor points FK, BK or by defining deviations of the rotational angle ranges from the values recited above (—, and after "table", insert—) see the above table.

For an elliptical core cross-section of the light waveguide, the attenuation of a length of 2.5 km can be very low, even lower than approximately 0.5 dB overall. Moreover, the polarization-maintaining light waveguide PMF can be simultaneously designed for compensation or emulation of chromatic light waveguide dispersion. In order to avoid an inadvertent destruction of the torsion sections TS, TS1, TS2, TS3, TS4 and in order, when needed, to be able to define the rotational angle of a stepping motor, for example following a current outage of the stepping motor controls, rotational blocks (detents) or angle sensors can be provided at the shafts of stepping motors SM.

Figure 4:
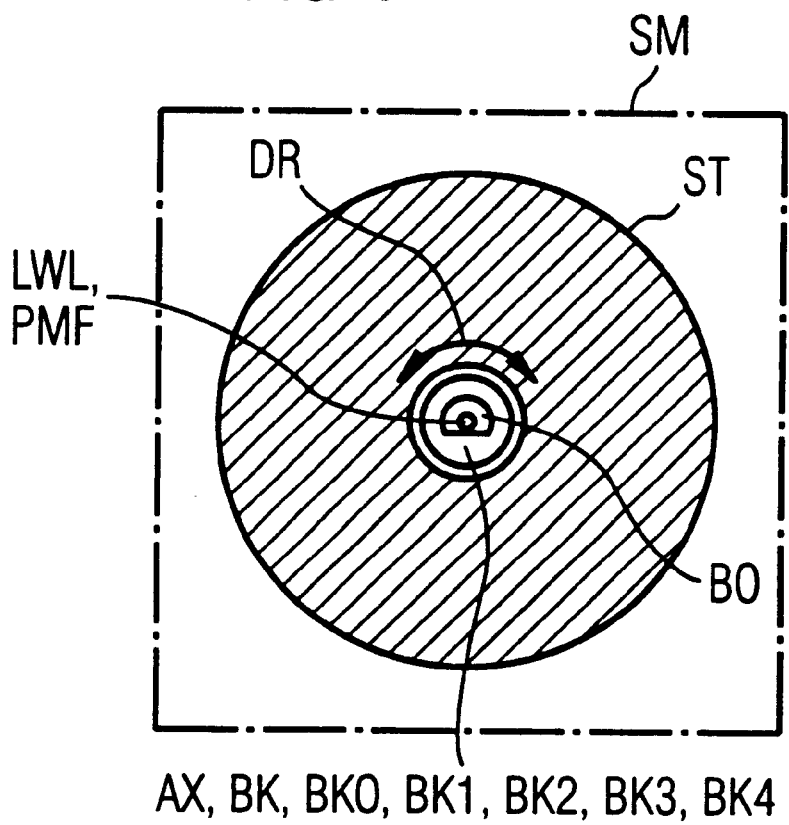
FIG. 4 is a pictorial diagram showing a movable anchor point of linearly birefringent light waveguide in the drilled axis of a stepping motor.

FIG. 4 shows a stepping motor SM having a schematically indicated stator ST and a shaft AX that is drilled with a bore BO. The light waveguide LWL exemplified here by a polarization-maintaining light waveguide PMF, is concentrically guided in the shaft diameter and stator. The light waveguide LWL, PMF is rigidly glued to the shaft AX, so that the shaft AX simultaneously represents a movable torsion anchor BK, BK0, BK1, BK2, BK3, BK4. This arrangement is extremely compact, particularly when using a stepping motor in a wafer-shaped (flat) structure, so that the entire polarization transformer PT of FIG. 3 can likewise be constructed compact. In particular, the spacings between the movable armature points BK, BK0, BK1, BK2, BK3, BK4 can be so slight that birefringent light waveguides PMF having beat wavelength of a modest size can be utilized.

Figure 5:
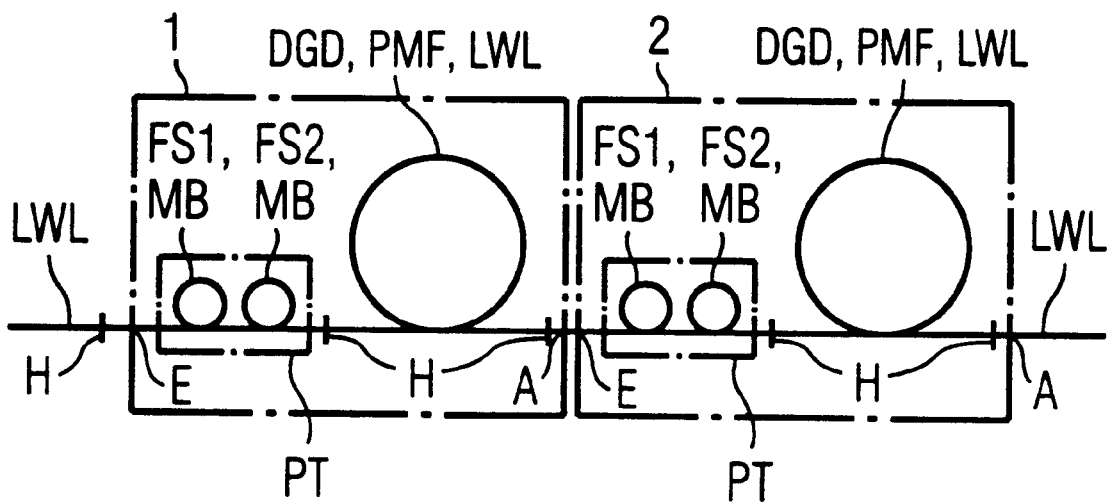
FIG. 5 is a schematic diagram showing two individual emulators or compensators that contain circularly birefringent light waveguides and movable light waveguide loops.

Whereas linearly birefringent light waveguides PMF and torsion as mechanical stressing MB in polarization transformers PT have previously been mentioned, twisted standard light waveguide LWL is utilized in another exemplary embodiment a circularly birefringent light waveguide PMF. As explained in Electron. Lett., 17 (1981) 11, pages 388 through 389, a normal, monomode light waveguide is lent a circular birefringence as a result of torsion. What is advantageous compared to the previously exemplary embodiments is that a normal light waveguide is easily obtainable. By way of example, FIG. 5 shows two individual emulators or compensators 1, 2 that contain a circularly birefringent light waveguide and movable light waveguide loops or fiber loops FS1, FS2. The light waveguide LWL is respectively clamped at retaining points H preceding and following the polarization transformer PT. Between two neighboring retaining points H that enclose a polarization transformer PT, the light waveguide LWL acts as a normal light waveguide without additional bending that is approximately non-birefringent. At least in specific positions of the rotatable fiber loops, it is untwisted given a light waveguide LWL that is freely movable in the light waveguide loops FS1, FS2, even in every position of these light waveguide loops FS1, FS2. In contrast between two neighboring retaining points (between which no polarization transformation PT lies), the light waveguide is highly twisted, so that it acts as a circularly birefringent and circularly polarization-maintaining light waveguide PMF having a differential group delay time DGD between the two circular, principal polarizations. For example, a stranding machine is suitable for manufacture. The polarization transformers PT contain fiber loops FS1, FS2, that are known, for example from Electronics Letters, Vol. 21, 1985, pages 895–896 and Electronics Letters, Vol. 22, 1986, pages 78–79 in a endless rotatable form, but these can also be rotatable in limited fashion—this facilitating design particularly when used as an emulator, but not as a compensator of PMD. Inventively, endless polarization transformation for the application required here can be achieved with two quarter-wave loops, i.e., fiber loops in which phase delays of pi/2 radiant occur between the principal polarizations that are linear and orthogonal relative to one another that arise upon bending. As a result of more than two fiber loops in a polarization transformer PT, manufacture-conditioned deficiencies of the light waveguide, for example, undesired torsion, can be compensated. The fiber loops FS1, FS2 are rotatably designed; moreover, the light waveguide LWL is bent thereat based on this very principle to produce, as in the first exemplary embodiment, a mechanical stressing MB of the light waveguide LWL.

As described in Electronics Letters, Feb. 17, 1994, Vol. 30, No. 4, pages 348 through 349, the inventive PMD compensator EK can be utilized in an optical receiver for PMD compensation.

The above-described apparatus is illustrative of the principles of the present invention. Numerous modifications and adaptions thereof will be readily apparent to those skilled in this art without departing from the spirit and scope of the present invention.

What is claimed is:

1. An apparatus that is an emulator or compensator of polarization mode dispersion of a light wave comprising:

an input;

a light waveguide connected to said input, of which at least one part is a polarization-maintaining light waveguide with a differential group delay time;

a polarization transformer connected to said light waveguide;

an output connected to said light waveguide;

a light waveguide that merges butt-free and splice-free into a polarization-maintaining light waveguide that has a linear birefringence comprising a differential group delay time that can be exposed to a mechanical stressing in a polarization transformer; and, a conversion mechanism that can at least partly convert a principal polarization of said polarization-maintaining light waveguide into an other principal polarization orthogonal to said principal polarization with an arbitrary and interruption-free, selectable phase shift relative to said principal polarization.

2. An apparatus according to claim 1, further comprising a plurality of individual emulators or compensators each having a respective input and an output, wherein an output of an individual emulator or compensator can be connected to an input of a following one.

3. An apparatus according to claim 1, wherein said light waveguide comprises a polarization-maintaining light waveguide with linear birefringence.

4. An apparatus according to claim 3, wherein at least one anchor point of said conversion mechanism comprises a plurality of comb tines, said comb tines belonging to different anchor points being movable relative to one another and following one another in periodic succession, so that torsion sections proceeding therebetween can be twisted in a periodically changing rotational manner.

5. An apparatus according to claim 3, further comprising a plurality of anchor points of said conversion mechanism that are separated from one another by successive torsion sections between two ending anchor points.

6. An apparatus according to claim 3, further comprising a stepping motor for rotating an anchor point of said conversion mechanism.

7. An apparatus according to claim 1, wherein said light waveguide is constructed such that:

said light waveguide is twisted between neighboring retaining points that do not enclose a polarization transformer, so that said light waveguide acts as a polarization-maintaining light waveguide with circular birefringence;

said light waveguide is not twisted, at least in a specific position of fiber loops, between retaining points enclosing a polarization transformer that comprises at least one movable fiber loop that, given movement, causes a mechanical stressing of said light waveguide, so that said fiber loops act like rotatable wave plates.

8. An apparatus according to claim 7, wherein at least one of said fiber loops acts at least approximately as a rotatable quarter-wave plate.

9. An apparatus that is an emulator or compensator of polarization mode dispersion of a light wave comprising:

an input, a light waveguide connected to said input, of which at least one part is a polarization-maintaining light waveguide with a differential group delay time;

a polarization transformer connected to said light waveguide;

a light waveguide that merges butt-free and splice-free into a polarization-maintaining light waveguide comprising a differential group delay time that can be exposed to a mechanical stressing in a polarization transformer;

said light waveguide being constructed such that:

said light waveguide is twisted between neighboring retaining points that do not enclose a polarization transformer, so that said light waveguide acts as a polarization-maintaining light waveguide with circular birefringence;

said light waveguide is not twisted, at least in a specific position of fiber loops, between retaining points enclosing a polarization transformer that comprises at least one movable fiber loop that, given movement, causes a mechanical stressing of said light waveguide, so that said fiber loops act like rotatable wave plates.

10. An apparatus according to claim 9, further comprising a plurality of individual emulators or compensators each having a respective input and an output, wherein an output of an individual emulator or compensator can be connected to an input of a following one.

* * * * *